US012163652B2

(12) United States Patent
Liu et al.

(10) Patent No.: US 12,163,652 B2
(45) Date of Patent: Dec. 10, 2024

(54) PHOTOELECTRIC CORE MODULE AND LAMP

(71) Applicants: SUZHOU OPPLE LIGHTING CO., LTD., Suzhou (CN); OPPLE LIGHTING CO., LTD., Shanghai (CN)

(72) Inventors: Zeyu Liu, Shanghai (CN); Guanghui Hu, Shanghai (CN); Jianmin Xie, Shanghai (CN); Aiping Wang, Shanghai (CN)

(73) Assignees: Suzhou Opple Lighting Co., Ltd., Suzhou (CN); Opple Lighting Co., Ltd., Shanghai (CN)

(*) Notice: Subject to any disclaimer, the term of this patent is extended or adjusted under 35 U.S.C. 154(b) by 0 days.

(21) Appl. No.: 18/371,439

(22) Filed: Sep. 21, 2023

(65) Prior Publication Data

US 2024/0011619 A1 Jan. 11, 2024

Related U.S. Application Data

(63) Continuation of application No. PCT/CN2022/082093, filed on Mar. 21, 2022.

(30) Foreign Application Priority Data

Mar. 23, 2021 (CN) ......................... 202110308105.3

(51) Int. Cl.

| | |
|---|---|
| ***F21V 3/00*** | (2015.01) |
| ***F21V 17/16*** | (2006.01) |
| ***F21Y 115/10*** | (2016.01) |

(52) U.S. Cl.

CPC ................ *F21V 3/00* (2013.01); *F21V 17/16* (2013.01); *F21Y 2115/10* (2016.08)

(58) Field of Classification Search

CPC .......... F21V 3/00; F21V 17/16; F21V 17/101; F21Y 2115/10; F21K 9/20; F21S 8/026

See application file for complete search history.

(56) References Cited

U.S. PATENT DOCUMENTS

| | | | | |
|---|---|---|---|---|
| 5,065,291 A * | 11/1991 | Frost | F21S 8/081 362/183 |
| 2015/0016097 A1* | 1/2015 | Martzall | F21K 9/23 362/183 |
| 2015/0247612 A1* | 9/2015 | Zhang | F21S 8/086 362/293 |

FOREIGN PATENT DOCUMENTS

| | | |
|---|---|---|
| CN | 102537707 A | 7/2012 |
| CN | 202769340 U | 3/2013 |

(Continued)

OTHER PUBLICATIONS

International Search Report of PCT Application No. PCT/CN2022/082093 dated Jun. 1, 2022 with English translation, (5p).

*Primary Examiner* — Thomas M Sember
(74) *Attorney, Agent, or Firm* — Arch & Lake LLP

(57) ABSTRACT

The disclosure discloses a photoelectric core module and a lamp, the photoelectric core module includes an insulating housing that has an accommodating space; a photoelectric module that is fixedly mounted to the insulating housing and is accommodated in the accommodating space; and a light-emitting mask that is assembled on the insulating housing in a non-detachable manner and sealing the accommodating space; and light emitted by the photoelectric module is capable of passing through the light-emitting mask.

20 Claims, 3 Drawing Sheets

(56) References Cited

FOREIGN PATENT DOCUMENTS

| | | | |
|---|---|---|---|
| CN | 204593108 | U | 8/2015 |
| CN | 205938744 | U | 2/2017 |
| CN | 206600703 | A | 10/2017 |
| CN | 211372113 | U | 8/2020 |
| CN | 113007675 | A | 6/2021 |
| CN | 113124348 | A | 7/2021 |

* cited by examiner

PHOTOELECTRIC CORE MODULE AND LAMP

CROSS-REFERENCE TO RELATED APPLICATIONS

This application is based upon and claims the priority of PCT patent application No. PCT/CN2022/082093 filed on Mar. 21, 2022 which claims priority to the Chinese patent application No. 202110308105.3 filed on Mar. 23, 2021, the entire contents of which are hereby incorporated by reference herein for all purposes.

TECHNICAL FIELD

The disclosure belongs to the technical field of lighting equipment, particularly relates to a photoelectric core module and a lamp.

BACKGROUND

With the popularity of LED lamp, a series of safety standards for the LED lamp are constantly being improved. In order to prevent a phenomenon of bad money driving out good, a random inspection of market safety regulations is becoming more and more strict, and new definitions have been made for some previously ambiguous safety regulation solutions.

SUMMARY

The disclosure provides an optoelectronic core module and a lamp.

The disclosure provides a photoelectric core module which includes an insulating housing, a photoelectric module and a light-emitting mask. The insulating housing has an accommodating space. The photoelectric module is fixedly mounted to the insulating housing and accommodated in the accommodating space. The light-emitting mask is assembled on the insulating housing in a non-detachable manner and seals the accommodating space. Light emitted by the photoelectric module is capable of passing through the light-emitting mask.

The disclosure also provides a lamp which includes the above optoelectronic core module.

It is to be understood that both the foregoing general description and the following detailed description are exemplary and explanatory only and are not restrictive of the present disclosure.

DETAILED DESCRIPTION

The technical solutions in the examples of the disclosure will be clearly and completely described below with reference to the accompanying drawings in the examples of the disclosure. It should be understood that the following specific examples are only used to help those skilled in the art to understand the disclosure, but are not intended to limit the disclosure.

Sometimes, a detachable mounting manner is adopted in most of panels of integrated downlights adopt, which is deemed unqualified in a new safety standard; in order to cater to a new safety standard situation, and as a company that strictly complies with the national safety standard, it needs to define and develop a new downlight architecture that meets the latest safety solution in facing a new safety environment.

The technical solutions provided by the disclosure will be described in detail below with reference to the accompanying drawings.

Figure 1:
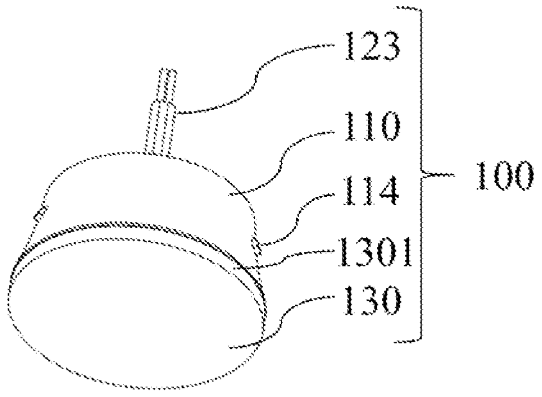
FIG. 1 is a structure schematic diagram of a photoelectric core module in one example of the disclosure.
Figure 2:
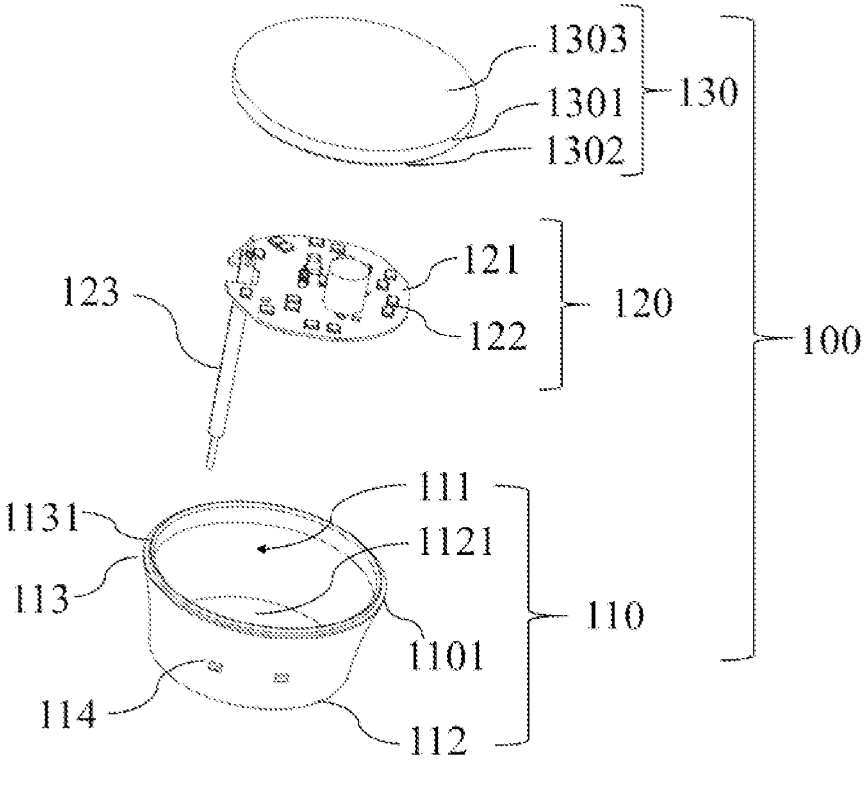
FIG. 2 is an internal structure schematic diagram of a photoelectric core module in one example of the disclosure.

As illustrated in FIG. 1 and FIG. 2, an example of the disclosure provides a photoelectric core module 100, which is applied in a lighting lamp, and the photoelectric core module 100 includes an insulating housing 110, a photoelectric module 120 and a light-emitting mask 130. The insulating housing 110 has an accommodating space 111; the photoelectric module 120 is fixedly mounted to the insulating housing 110 and accommodated in the accommodating space 111; the light-emitting mask 130 is assembled on the insulating housing 110 in a non-detachable manner and seals the accommodating space 111; and light emitted by the optoelectronic module 120 can pass through the light-emitting mask 130.

In this example, as illustrated in FIG. 1 and FIG. 2, an outer peripheral surface 1301 of the light-emitting mask 130 is flush with an outer peripheral surface 1101 of the insulating housing 110, so as to realize an integration design of an overall appearance of the optoelectronic core module 100. Specifically, the light-emitting mask 130 is flat-shaped and has an inner horizontal surface 1302 and an outer horizontal surface 1303 that are arranged oppositely. The outer peripheral surface 1301 is a cylindrical surface that is used to vertically connect the inner horizontal surface 1302 and the outer horizontal surface 1303. In a case where the light-emitting mask 130 is assembled on the insulating housing 110 in a non-detachable manner and seals the accommodating space 111, the inner horizontal surface 1302 faces the accommodating space 111 of the insulating housing 110, and the outer horizontal surface 1303 faces outside.

The insulating housing 110 includes a mounting end 112 and a light-emitting end 113, the mounting end 112 is provided with a mounting plate 1121, and the photoelectric module 120 is arranged on the mounting plate 1121; the light-emitting end 113 is in a shape of an opening, and the light-emitting mask 130 is arranged on the light-emitting end 113 for sealing the light-emitting end 113. In this example, the insulating housing 110 is in a shape of a hollow truncated cone, and an outer diameter of the light-emitting end 113 is larger than an outer diameter of the mounting end 112. A snapping and fixing structure 1131 is provided at the light-emitting end 113 of the insulating housing 110 for fixing the light-emitting mask 130. The snapping and fixing structure 1131 is an annular flange, and the annular flange is embedded in the light-emitting mask 130, this kind of embedding is called interference fitting, thereby forming a non-detachable connection.

In other examples, a back surface of the optoelectronic module 120 can further serves as the mounting plate 1121, and then the optoelectronic module 120 and the insulating housing 110 are directly welded together as a whole. In general, the mounting plate 1121 can be a part of an overall structure of the insulating housing 110, or can be a separate component that is welded to the insulating housing 110, or can be formed by using the back surface of the photoelectric module 120, which is more beneficial to a lightweight design of the optoelectronic core module 100.

A reflector can further be provided on an inner peripheral surface of the insulating housing 110, and the reflector is one of a light-reflecting cladding, a light-reflecting film and a light-reflecting housing, the reflector can reflect light emitted by the photoelectric module 120, and the reflector has a function of gathering light to avoid light waste, which improves an optical performance of the lighting lamp. In addition, a plurality of protrusions 114 are provided on the outer peripheral surface of the insulating housing 110.

The photoelectric module 120 includes a circuit board 121 and a light source 122 arranged on the circuit board 121, and the light source 122 faces the light-emitting mask 130. The light source 122 is a plurality of LED light sources, and the plurality of LED light sources are distributed on the circuit board 121. The photoelectric module 120 further includes an electrical connection component 123, one end of the electrical connection component 123 is electrically connected with the circuit board 121, and the other end of the electrical connection component 123 protrudes outside the insulating housing 110, for connecting with an external power and provide a power connection for the light source 122.

In this example, the electrical connection component 123 includes a standard connector and a wire or a cable connected with the connector, the wire is connected with the circuit board 121, and the connector is connected with the external power.

The example does not limit the non-detachable connection manner between the insulating housing 110 and the light-emitting mask 130, in addition to the connection manner mentioned in this example (such as forming an interference fitting by embedding), other non-detachable connection manners can also be used, for example, the insulating housing 110 and the light-emitting mask 130 can form a non-detachable connection through hot melting, or form a non-detachable connection through adhesive bonding.

Figure 3:
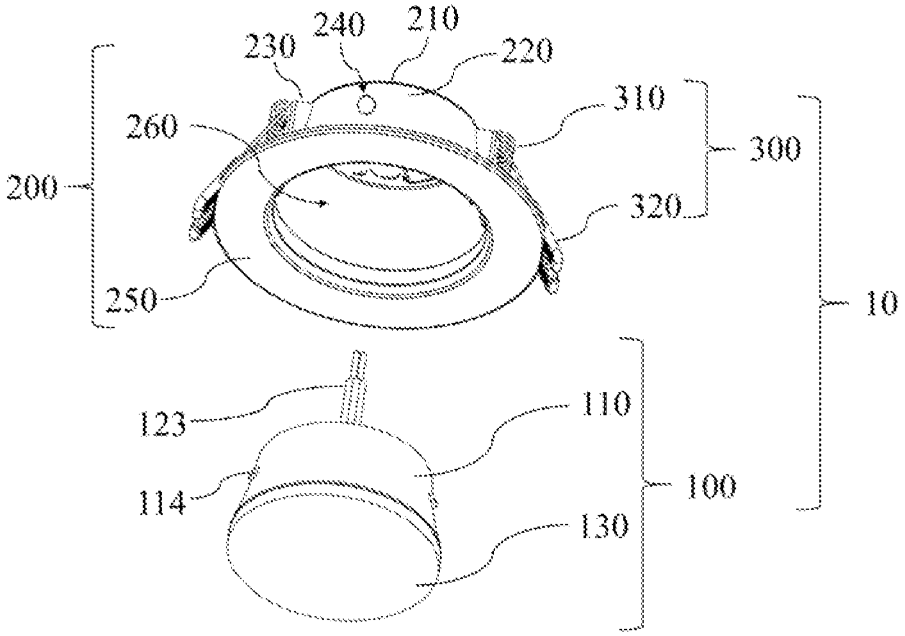
FIG. 3 is a structure schematic diagram of a lamp in one example of the disclosure, which mainly illustrates an assembly relationship between a lamp body and a photoelectric core module.

As illustrated in FIG. 3, the example of the disclosure further provides a lamp 10, which includes the above-mentioned photoelectric core module 100. The lamp 10 further includes a lamp body 200, the lamp body 200 has a mounting space 260, and the optoelectronic core module 100 is arranged in the mounting space 260. The lamp body has a top end 210 and a bottom end 250, the top end 210 can be mounted to a mounting base, and the bottom end 250 is in a shape of an opening; the mounting end 112 of the photoelectric core module 100 is mounted to the top end 210; the light-emitting mask 130 of the optoelectronic core module 100 is flush with the bottom end 250.

More specifically, in this example, the optoelectronic core module 100 is embedded in the mounting space 260, and contours of the optoelectronic core module and the mounting space are substantially the same. When the optoelectronic core module is embedded in the mounting space, a slight gap can exists between an outer contour of the optoelectronic core module and an inner peripheral surface of the mounting space, but the outer contour of the optoelectronic core module can further be tightly sealed with the inner peripheral surface of the mounting space to achieve a higher integrity requirement.

A slot is provided on the inner peripheral surface of the lamp body 200, and the slot can fit with the protrusion 114 provided on the insulating housing 110 of the optoelectronic core module 100. Because the slot is located on the inner peripheral surface, it cannot be illustrated in FIG. 3. It is conceivable that, in other examples, a protrusion is provided on the inner peripheral surface of the lamp body 200 and a slot is provided on the insulating housing 110 of the optoelectronic core module 100, which is also a feasible connection manner.

Figure 4:
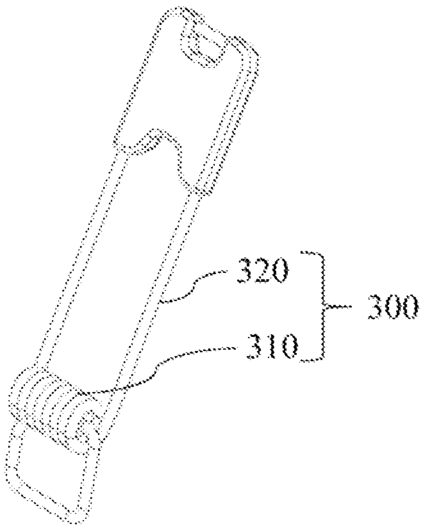
FIG. 4 is a structure schematic diagram of a clamp spring of a lamp in one example of the disclosure.

As illustrated in FIG. 3 and FIG. 4, the outer peripheral surface of the lamp body 200 is further provided with a circlip 300, which can mount the lamp body 200 to the mounting base.

An assembly and a mounting of the lamp body 200 and the optoelectronic core module 100 will be further described below with reference to FIG. 3 and FIG. 4.

As illustrated in FIG. 3, a lamp body 200 in a shape of trumpet is connected with a circlip 300. The top end 210 of the lamp body 200 is connected with a side wall 220 of the lamp body, the top end 210 and the side wall 220 of the lamp body form the mounting space 260, and the lamp body 200 is provided with a circlip receiving portion 230.

As illustrated in FIG. 4, the circlip 300 includes an elastic portion 310 and a mounting portion 320, the elastic portion 310 is connected with the mounting portion 320, and the elastic portion 310 is used to elastically connect the circlip 300 with the lamp body 200, at the same time, the elastic portion 310 can provide resilience for the mounting portion 320. The mounting portion 320 is used to connect with the mounting base, so as to realize the mounting of the lighting lamp. The mounting base can be a ceiling, of course, it can also be another mounting structure, which is not limited in the example.

In a case where the elastic portion 310 of the circlip 300 is assembled on the circlip receiving portion 230, the lamp body 200 limits the circlip 300 in the circlip receiving portion 230, thereby preventing the circlip 300 from falling out from the circlip receiving portion 230. In a case where the lamp body 200 with such a structure is mounted with the circlip 300, the elastic portion 310 can be hooked without a relevant hooking component, and the circlip 300 only needs to be placed in the circlip receiving portion 230, and the lamp body 200 limits the circlip 300 in the circlip receiving portion 230, so as to prevent the circlip 300 from falling out. In this way, an operator does not need to exert a large force, so it is not easy to scratch the operator and a labor intensity of the operator can be reduced. Meanwhile, a mounting manner of the circlip 300 is simple, thereby reducing mounting difficulty of the circlip 300, which improves a mounting efficiency of the circlip 300, and further improves an assembly efficiency of the lighting lamp.

In this example, as illustrated in FIG. 3, the top end 210 or the side wall 220 of the lamp body is provided with a threading slot 240, and the electrical connection component 123 of the photoelectric module 120 can pass through the threading slot 240 to go out of the lamp body 200 and is further connected with an external power source, so that the photoelectric module 120 can be controlled and powered.

Figure 5:
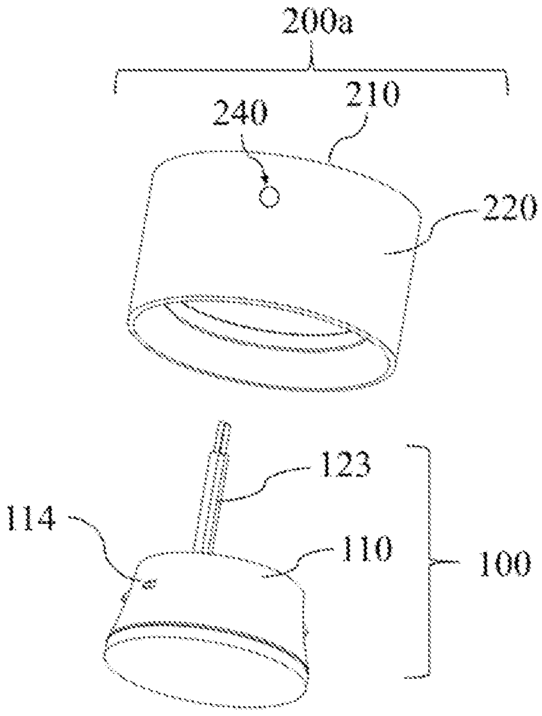
FIG. 5 is a structure schematic diagram of a lamp in another example of the disclosure, which mainly illustrates an assembly relationship between a lamp body and a photoelectric core module.

As illustrated in FIG. 5, in another example, the disclosure also provides another straight cylindrical lamp body **200*a*, the lamp body 200*a* includes a top end 210 and a side wall 220 of the lamp body, an inner peripheral surface of the lamp body 200*a* is provided with a slot, which can fit with a protrusion 114 provided on an insulating housing 110 of a photoelectric core module 100, and the top end 210 or the side wall 220 of the lamp body is provided with a threading slot 240, the electrical connection component 123 of the photoelectric module 120 passes through the lamp body 200***a* from the threading slot 240, and is further connected with an external power source, so that the photoelectric module 120 can be controlled and powered.

The optoelectronic core module provided by the example of the disclosure has a non-detachable structure, which is convenient for replacement and mounting, the optoelectronic core module can be used as a standard optoelectronic module, which provides a unified standard interface, and can quickly change an appearance and quickly switch a category. The photoelectric core module can be quickly mounted in the lamp body, and the lamp body can be in a shape of an embedded downlight, a ceiling-mounted downlight, or a lifting-mounted lamp according to requirements. The example does not limit the shape of the lamp body, the lamp body can be in a shape of trumpet as illustrated in FIG. 3, or in a shape of straight cylindrical as illustrated in FIG. 5, or in other shapes.

The disclosure is to provide an optoelectronic core module and a lamp, the optoelectronic core module can be used as a standard optoelectronic module, provide a unified industry standard interface, and can quickly change an appearance and quickly switch a category.

The disclosure provides a photoelectric core module, comprising: an insulating housing, a photoelectric module and a light-emitting mask. The insulating housing has an accommodating space. The photoelectric module is fixedly mounted to the insulating housing and accommodated in the accommodating space. The light-emitting mask is assembled on the insulating housing in a non-detachable manner and seals the accommodating space. Light emitted by the photoelectric module is capable of passing through the light-emitting mask.

In one example, the insulating housing and the light-emitting mask are assembled and connected together by at least one manner of hot melting, interference fitting and adhesive bonding.

In one example, an outer peripheral surface of the light-emitting mask is flush with the outer peripheral surface of the insulating housing.

In one example, the light-emitting mask is flat-shaped and has an inner horizontal surface and an outer horizontal surface that are arranged oppositely, and the outer peripheral surface of the light-emitting mask vertically connects the inner horizontal surface and the outer horizontal surface; wherein the inner horizontal surface faces towards the accommodating space of the insulating housing, and the outer horizontal surface faces outside.

In one example, the insulating housing comprises: a mounting end, provided with a mounting plate, wherein the photoelectric module is arranged on the mounting plate; or a back surface of the photoelectric module serves as the mounting plate and is welded to the insulating housing as a whole; and a light-emitting end, in a shape of an opening, wherein the light-emitting mask is arranged on the light-emitting end for sealing the light-emitting end.

In one example, the insulating housing is in a shape of a hollow truncated cone, and an outer diameter of the light-emitting end is larger than an outer diameter of the mounting end.

In one example, a reflector is provided on an inner peripheral surface of the insulating housing.

In one example, the reflector is one of a light-reflecting cladding, a light-reflecting film and a light-reflecting housing.

In one example, the optoelectronic module comprises a circuit board and a light source arranged on the circuit board, and the light source faces the light-emitting mask.

In one example, the light source is a plurality of LED light sources, and the plurality of LED light sources are distributed on the circuit board.

In one example, the optoelectronic module further comprises an electrical connection component, and one end of the electrical connection component is electrically connected with the circuit board; the other end of the electrical connection component extends outside the insulating housing and is used to connect with an external power and provides a power connection for the light source.

In one example, a snapping and fixing structure is provided at the light-emitting end of the insulating housing for fixing the light-emitting mask.

In one example, the snapping and fixing structure is an annular flange, and the annular flange is embedded in the light-emitting mask to form a non-detachable connection.

The disclosure also provides a lamp, comprising any one of the above optoelectronic core modules.

In one example, the lamp further comprises a lamp body, wherein the lamp body has a mounting space, and the photoelectric core module is embedded in the mounting space.

In one example, the lamp body has a top end and a bottom end, the top end can be mounted to a mounting base, and the bottom end is in a shape of an opening; the mounting end of the optoelectronic core module is mounted on the top end; the light-emitting mask of the optoelectronic core module is flush with the bottom end.

In one example, one of a slot and a protrusion is provided on the inner peripheral surface of the lamp body, and the other of the slot and the protrusion is provided on the insulating housing of the photoelectric core module, and the lamp body and the optoelectronic core module is connected together by fitting the slot with the protrusion.

In one example, the lamp body is in a shape of a trumpet or a straight tube.

In one example, the outer peripheral surface of the lamp body is provided with a circlip, which is capable of mounting the lamp body to the mounting base.

The beneficial effects of the disclosure are as follows: by designing the optoelectronic core module as a standard module and providing a unified standard interface, the optoelectronic core module and the lamp provided by the disclosure can quickly change the appearance and quickly switch the category. The photoelectric core module includes an insulating housing, a photoelectric module, and a light-emitting mask, the insulating housing and the light-emitting mask are non-detachably connected together, and the photoelectric module is packaged therein. Therefore, the photoelectric core module of the disclosure is convenient to replace and mount, the photoelectric core module can be quickly mounted in the lamp body, and the lamp body can be in a shape of an embedded downlight, a ceiling-mounted downlight, or a lifting-mounted lamp according to requirements.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The disclosure has been described by the above-mentioned related examples, but the above-mentioned examples are only examples for implementing the disclosure. It is necessary to point out that the disclosed examples do not limit a scope of the disclosure.

The invention claimed is:

1. An optoelectronic core module, comprising:

an insulating housing, having an accommodating space;

a photoelectric module, fixedly mounted to the insulating housing and accommodated in the accommodating space; and a light-emitting mask, assembled on the insulating housing in a non-detachable manner and sealing the accommodating space;

wherein light emitted by the photoelectric module is configured to pass through the light-emitting mask;

wherein the optoelectronic core module is embedded into a mounting space in a lamp body, and an inner peripheral surface of the mounting space and an outer contour of the optoelectronic core module are connected; and wherein the lamp body comprises a threading slot, the optoelectronic core module comprises an electrical connection component, and the electrical connection component is configured to pass through the mounting space and the threading slot and extend outside the lamp body.

2. The optoelectronic core module according to claim 1, wherein the insulating housing and the light-emitting mask are assembled and connected together by at least one manner of hot melting, interference fitting and adhesive bonding; or, a plurality of protrusions are provided on an outer peripheral surface of the insulating housing.

3. The optoelectronic core module according to claim 1, wherein an outer peripheral surface of the light-emitting mask is flush with the outer peripheral surface of the insulating housing.

4. The optoelectronic core module according to claim 3, wherein the light-emitting mask is flat-shaped and has an inner horizontal surface and an outer horizontal surface that are arranged oppositely, and the outer peripheral surface of the light-emitting mask vertically connects the inner horizontal surface and the outer horizontal surface; and wherein the inner horizontal surface faces towards the accommodating space of the insulating housing, and the outer horizontal surface faces outside.

5. The optoelectronic core module according to claim 1, wherein the insulating housing comprises:

a mounting end, provided with a mounting plate, wherein the photoelectric module is arranged on the mounting plate; or a back surface of the photoelectric module serves as the mounting plate and is welded to the insulating housing as a whole; and a light-emitting end, in a shape of an opening, wherein the light-emitting mask is arranged on the light-emitting end for sealing the light-emitting end.

6. The optoelectronic core module according to claim 5, wherein the insulating housing is in a shape of a hollow truncated cone, and an outer diameter of the light-emitting end is larger than an outer diameter of the mounting end.

7. The optoelectronic core module according to claim 5, wherein a snapping and fixing structure is provided at the light-emitting end of the insulating housing for fixing the light-emitting mask.

8. The optoelectronic core module according to claim 7, wherein the snapping and fixing structure is an annular flange, and the annular flange is embedded in the light-emitting mask to form a non-detachable connection.

9. The optoelectronic core module according to claim 1, wherein a reflector is provided on an inner peripheral surface of the insulating housing.

10. The optoelectronic core module according to claim 9, wherein the reflector is one of a light-reflecting cladding, a light-reflecting film and a light-reflecting housing.

11. The optoelectronic core module according to claim 1, wherein the optoelectronic module comprises a circuit board and a light source arranged on the circuit board, and the light source faces the light-emitting mask.

12. The optoelectronic core module according to claim 11, wherein the light source is a plurality of LED light sources, and the plurality of LED light sources are distributed on the circuit board.

13. The optoelectronic core module according to claim 11, wherein one end of the electrical connection component is electrically connected with the circuit board; and the other end of the electrical connection component extends outside the insulating housing and is used to connect with an external power and provides a power connection for the light source.

14. The optoelectronic core module of claim 1, wherein:

the inner peripheral surface of the lamp body comprises a slot and an outer surface of the insulating housing of the optoelectronic core module comprises a protrusion; or the inner peripheral surface of the lamp body comprises the protrusion and the outer surface of the insulating housing of the optoelectronic core module comprises the slot, and wherein the protrusion is configured to fit with the slot to embed the optoelectronic core module in the mounting space.

15. A lamp, comprising: an optoelectronic core module and a lamp body, and wherein:

the optoelectronic core module comprises:

an insulating housing, having an accommodating space;

a photoelectric module, fixedly mounted to the insulating housing and accommodated in the accommodating space; and a light-emitting mask, assembled on the insulating housing in a non-detachable manner and sealing the accommodating space;

wherein light emitted by the photoelectric module is configured to pass through the light-emitting mask;

wherein the lamp body comprises a mounting space, the optoelectronic core module is embedded into the mounting space in the lamp body, and an inner peripheral surface of the mounting space and an outer contour of the optoelectronic core module are connected; and wherein the lamp body comprises a threading slot, the optoelectronic core module comprises an electrical connection component, and the electrical connection component is configured to pass through the mounting space and the threading slot and extend outside the lamp body.

16. The lamp according to claim 15, wherein the lamp body comprises a top end and a bottom end, the top end can be mounted to a mounting base, and the bottom end is in a shape of an opening;

a mounting end of the optoelectronic core module is mounted on the top end;

the light-emitting mask of the optoelectronic core module is flush with the bottom end; or, one of a slot and a protrusion is provided on the inner peripheral surface of the lamp body, and the other of the slot and the protrusion is provided on the insulating housing of the optoelectronic core module, and the lamp body and the optoelectronic core module is connected together by fitting the slot with the protrusion; or, the lamp body is in a shape of a trumpet or a straight tube; or, the outer peripheral surface of the lamp body is provided with a circlip, which is capable of mounting the lamp body to the mounting base.

17. A lamp, comprising: an optoelectronic core module and a lamp body, and wherein:

the optoelectronic core module comprises:

an insulating housing, having an accommodating space;

a photoelectric module, fixedly mounted to the insulating housing and accommodated in the accommodating space; and a light-emitting mask, assembled on the insulating housing in a non-detachable manner and sealing the accommodating space;

wherein light emitted by the photoelectric module is configured to pass through the light-emitting mask;

wherein the lamp body comprises a mounting space, and the optoelectronic core module is embedded into the mounting space;

wherein the lamp body comprises a circlip and a circlip receiving portion, and the circlip is configured to mount the lamp body to a mounting base;

wherein the circlip comprises an elastic portion, and the circlip is configured to elastically connect to the lamp body through the elastic portion; and wherein the circlip is further configured to be placed in the circlip receiving portion, and the lamp body is configured to limit the circlip in the circlip receiving portion.

18. The lamp of claim 17, wherein:

an inner peripheral surface of the lamp body comprises a slot and an outer surface of the insulating housing of the optoelectronic core module comprises a protrusion; or the inner peripheral surface of the lamp body comprises the protrusion and the outer surface of the insulating housing of the optoelectronic core module comprises the slot, and wherein the protrusion is configured to fit with the slot to embed the optoelectronic core module in the mounting space.

19. The lamp of claim 17, wherein the insulating housing and the light-emitting mask are assembled and connected together by at least one manner of hot melting, interference fitting and adhesive bonding; or, a plurality of protrusions are provided on an outer peripheral surface of the insulating housing.

20. The lamp of claim 17, wherein an outer peripheral surface of the light-emitting mask is flush with the outer peripheral surface of the insulating housing.

* * * * *